US008549029B2

(12) United States Patent
Delegue et al.

(10) Patent No.: US 8,549,029 B2
(45) Date of Patent: Oct. 1, 2013

(54) METHOD FOR GENERATING DATA ENABLING THE SEARCH FOR CONTENT, SYSTEM, TERMINAL, AND SERVER COMPLEMENTS TO IMPLEMENT THE METHOD

(75) Inventors: Gérard Delegue, Nozay (FR); Erwan Baynaud, Nozay (FR)

(73) Assignee: Alcatel Lucent, Paris (FR)

( * ) Notice: Subject to any disclaimer, the term of this patent is extended or adjusted under 35 U.S.C. 154(b) by 298 days.

(21) Appl. No.: 12/362,044

(22) Filed: Jan. 29, 2009

(65) Prior Publication Data

US 2009/0198658 A1     Aug. 6, 2009

(30) Foreign Application Priority Data

Jan. 31, 2008   (FR) ...................................... 08 00541

(51) Int. Cl.
*G06F 17/30*      (2006.01)
(52) U.S. Cl.
USPC ........... 707/769; 707/705; 707/706; 707/709; 707/724; 707/733; 707/734; 707/784
(58) Field of Classification Search
USPC .................. 707/706, 713, 913, 914, 915, 916, 707/917, 999.107, 705, 709, 712, 724, 726, 707/729, 754, 769, 733, 734, 784
See application file for complete search history.

(56) References Cited

U.S. PATENT DOCUMENTS

| | | | | |
|---|---|---|---|---|
| 6,823,366 B1* | 11/2004 | Nakano | ......................... | 709/206 |
| 7,702,673 B2* | 4/2010 | Hull et al. | ..................... | 707/707 |
| 2004/0174824 A1* | 9/2004 | Ohta et al. | ..................... | 370/252 |
| 2005/0193017 A1* | 9/2005 | Kim | ........................... | 707/104.1 |
| 2006/0008256 A1* | 1/2006 | Khedouri et al. | ............. | 386/124 |
| 2007/0011704 A1* | 1/2007 | Anglin, Jr. | ...................... | 725/46 |
| 2007/0162502 A1* | 7/2007 | Thomas et al. | ............ | 707/104.1 |
| 2007/0260704 A1* | 11/2007 | Sagoo et al. | ................... | 709/217 |
| 2008/0022308 A1* | 1/2008 | Garcea | ............................ | 725/46 |
| 2008/0046958 A1* | 2/2008 | Del Beccaro et al. | ......... | 725/143 |
| 2008/0155109 A1* | 6/2008 | Khedouri et al. | ............. | 709/229 |
| 2008/0160910 A1* | 7/2008 | Khedouri et al. | ............ | 455/3.06 |

(Continued)

FOREIGN PATENT DOCUMENTS

| | | | |
|---|---|---|---|
| EP | 1089201 A1 * | 4/2001 | |
| EP | 1286541 A1 * | 2/2003 | |

OTHER PUBLICATIONS

PCT Application No. PCT/EP2009/051094, Written Opinion of the International Searching Authority, Mar. 11, 2009 (5 pages).

(Continued)

*Primary Examiner* — Thanh-Ha Dang
(74) *Attorney, Agent, or Firm* — Fay Sharpe LLP

(57) ABSTRACT

A method for generating data enabling searching for content complements intended for terminals of a telecommunication network is provided. In one embodiment, the method includes selecting content from a terminal, generating identification information of the selected content, sending a marker generation request to a content complement server, and, in response to receiving the request, generating and saving a marker at the content complement server. The request includes the user's identification data and the identification information of the selected content. The marker includes the user's identification data, the identification information of the selected content, and search characteristics data enabling an additional search for content related to the selected content. A system, a terminal, and a server associated with the method are also provided.

27 Claims, 2 Drawing Sheets

(56) References Cited

U.S. PATENT DOCUMENTS

| | | | |
|---|---|---|---|
| 2008/0163379 A1* | 7/2008 | Robinson et al. | 726/27 |
| 2008/0172413 A1* | 7/2008 | Chiu | 707/104.1 |
| 2008/0178239 A1* | 7/2008 | Yampanis | 725/110 |
| 2008/0201375 A1* | 8/2008 | Khedouri et al. | 707/104.1 |
| 2008/0201376 A1* | 8/2008 | Khedouri et al. | 707/104.1 |
| 2008/0212945 A1* | 9/2008 | Khedouri et al. | 386/124 |
| 2008/0305738 A1* | 12/2008 | Khedouri et al. | 455/3.06 |
| 2009/0054092 A1* | 2/2009 | Stonefield et al. | 455/466 |
| 2010/0115346 A1* | 5/2010 | Lee | 714/49 |
| 2010/0211558 A1* | 8/2010 | Bonabeau et al. | 707/706 |
| 2011/0009051 A1* | 1/2011 | Khedouri et al. | 455/3.06 |
| 2011/0219421 A1* | 9/2011 | Ullman et al. | 725/117 |
| 2012/0016902 A1* | 1/2012 | Ranjan et al. | 707/769 |

OTHER PUBLICATIONS

European Application No. 09151802.7, European Search Report and Written Opinion, Mar. 2, 2009 (5 pages).

PCT Application No. PCT/EP2009/051094; International Search Report, Mar. 11, 2009 (3 pages).

* cited by examiner

METHOD FOR GENERATING DATA ENABLING THE SEARCH FOR CONTENT, SYSTEM, TERMINAL, AND SERVER COMPLEMENTS TO IMPLEMENT THE METHOD

CROSS-REFERENCES

The application claims the benefit of French Application No. 0800541, filed Jan. 31, 2008.

BACKGROUND

The invention pertains to fixed or mobile telecommunications networks (for example GSM, GPRS, UMTS, or WiFi networks, or an Internet network, or a hard-wired network), and more specifically the transmission by such networks of content intended for terminals capable of receiving and displaying the transmitted content.

The term "content" refers to sets of data defining a television, video, or audio (radio or music) program, or games, or multimedia, or a computer data file. "Network" refers to any type of telecommunication network capable of transmitting content, by means of wires or wirelessly, to terminals which are coupled to said network, and to exchange data or messages with those same terminals. Any content transmission mode may be considered, particularly peer-to-peer (or "unicast") mode, point-to-multipoint (or "multicast") mode, or broadcast mode.

"Terminal" refers to any type of equipment capable of receiving content from a network of the aforementioned type, and of exchanging data, messages and requests with said telecommunication network.

It may, for example, be a land-line or mobile telephone, a personal digital assistant (or PDA), an encrypted video or television program decoder, a set-top television program receiving device, a video or music program receiving device, a desktop or portable computer, or a vehicle on-board device (such as a car, truck, bus, train, or other).

In order to satisfy a large number of customers, content providers offer their customers services, e.g. an interactive service which meets the requirements of the largest possible subgroup of said customers.

SUMMARY

The purpose of the invention is therefore to improve known interactive content-transmission services, by making it possible to provide content to the users, said content potentially being contextual, personalized, and adapted to each user.

To that end, the object of the invention is a method for generating data enabling searching for content complements intended for terminals of a telecommunication network, comprising the following steps:
  selecting content from a terminal,
  generating identification information of the selected content,
  sending a marker generation request to a content complement server, said request containing:
    the user's identification data, and
    the identification information of the selected content,
  from the content complement server, receiving said request and generating and saving a marker containing:
    the user's identification data,
    the identification information of the selected content, and
    search characteristics data enabling an additional search for content related to the selected content.

In this manner, each user may simply and easily have automatic access to information complements.

In one variant, the content selected from the terminal is audiovisual content.

In one preferred embodiment, the method comprises a step of selecting, from the terminal, a saved marker. The selection of said marker triggers a search, by said server, for content complements, based on at least some data contained within said selected marker.

Advantageously, the method comprises a step wherein said server sends said terminal the list of searched-for content complements related to said selected marker.

Preferably, the list of content complements further comprises information explaining the connection between the content complements and the selected content.

Preferentially, the method comprises a step wherein the user of the user of the terminal selects at least one of said searched-for content complements from the list.

Advantageously, the method comprises a step wherein the terminal reads the searched-for selected content complement.

Another object of the invention is a system for implementing a method for generating data enabling searching for content complements intended for terminals of a telecommunication network according to one of the preceding claims, comprising:
  at least one terminal comprising:
    content selection means,
    means for generating identification information for the selected content,
    transmission means for transmitting a request to a content complement server to generate at least one marker enabling searching for content complements related to the selected content, the request containing:
      the user's identification data, and
      the identification information of the selected content,
  at least one server of content complements intended for terminals, comprising:
    receiving means for receiving said request transmitted by the terminal, containing:
      the users identification data, and
      the identification information of the selected content,
    generating means for generating, based on said request transmitted by the terminal, a marker containing:
      the user's identification data,
      the identification information of the selected content, and
      search characteristics data enabling an additional search for content related to the selected content.

A further object of the invention is a telecommunication network terminal capable of receiving content and comprising:
  content selection means,
  generating means for generating the identification information of the selected content,
  transmission means for transmitting a request to a content complement server, for at least one marker enabling searching for content complements related to the selected content, the request containing:
    the user's identification data, and
    the identification information of the selected content.

Finally, another object of the invention is a content complement server, said content being intended for terminals of a telecommunication network, comprising:
  means for receiving a request transmitted by a terminal containing:

the user's identification data, and the identification information of a selected CONTENT, means for generating, based on said request transmitted by the terminal, a marker containing:

the user's identification data, the identification information of the selected content, and search characteristics data enabling an additional search for content related to the selected content.

Preferably, the server comprises means for searching for content complements based at least on some of a selected marker's data.

DESCRIPTION OF DRAWINGS

Other characteristics and advantages of the invention will become apparent upon reading the following description, given as an example, with reference to the attached drawings, where.

DETAILED DESCRIPTION

Figure 1:
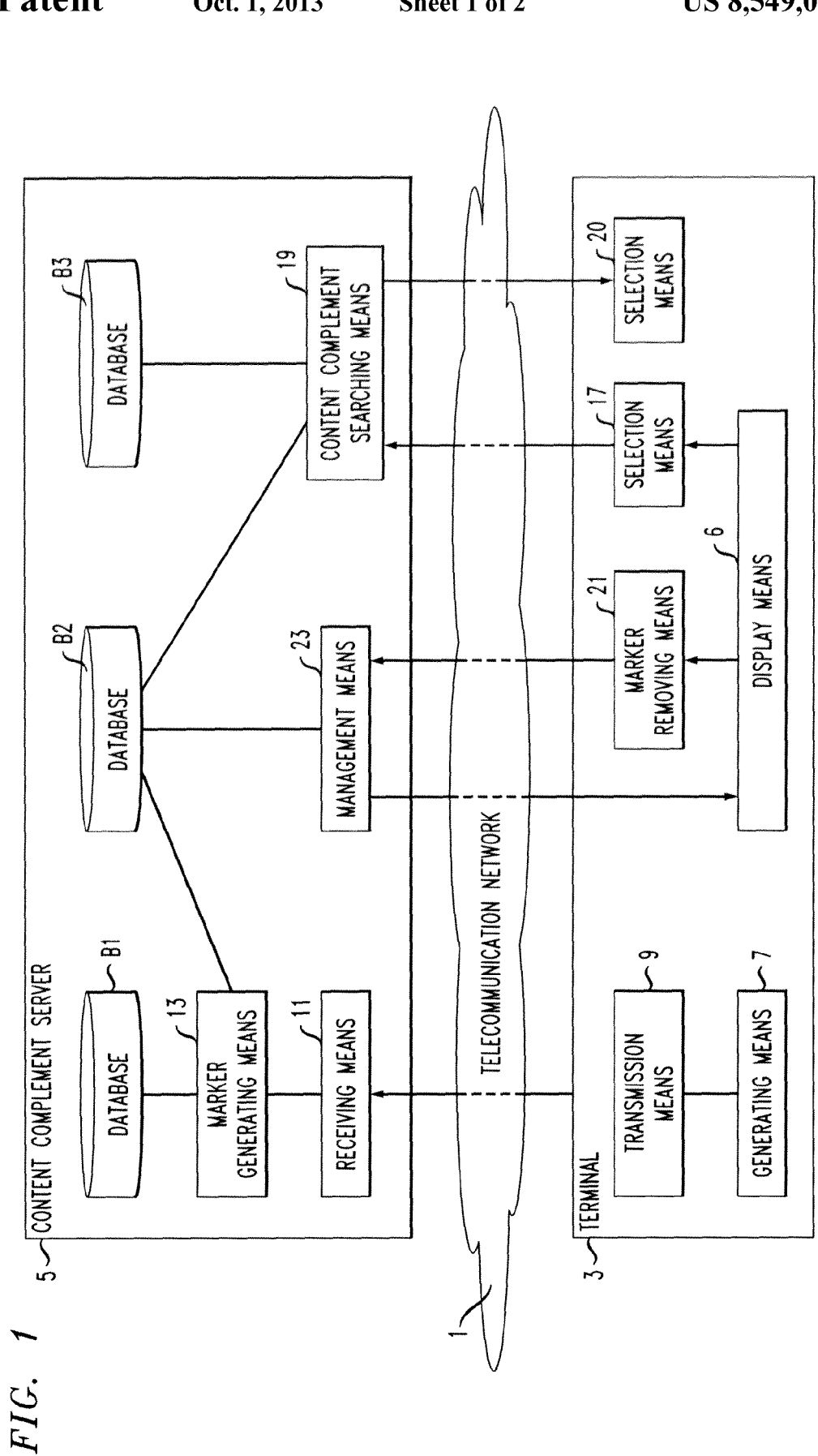
FIG. 1 schematically depicts the general structure of a system for implementing a data generation method enabling searching for content complements according to the invention.

FIG. 1 depicts a fixed or mobile telecommunication network 1 (for example, a GSM, GPRS, UMTS or WiFi network, an Internet network, or a hard-wired network) which transmits the content of programs, e.g. in the form of streams, to terminals capable of receiving and displaying, e.g. on a screen, the content transmitted.

The telecommunication network may be any type of telecommunication network capable of transmitting content, by means of wires or wirelessly, to terminals which are coupled to it, and to exchange data or messages with those same terminals. Any content transmission mode may be considered, particularly peer-to-peer (or "unicast") mode, point-to-multipoint (or "multicast") mode, or broadcast mode.

The content transmitted by the telecommunication network 1 may be audiovisual content, for example television or radio programs, or videos, or games.

This telecommunication network 1 further comprises a content complement server 5 which, interacting with a terminal, makes it possible to implement a data generation method by searching for content complements intended for terminals.

In the illustrated example, FIG. 1 shows a terminal 3 for accessing content made available via the telecommunication network 1, such as television or radio programs or videos, etc., which are displayed on the display means 6 of the terminal 3. The terminal 3 is further capable of exchanging data, messages and requests with the telecommunication network 1, and in particular with the server 5, as will be described later.

The terminal 3 may, for example, be a land-line or mobile telephone, a personal digital assistant (PDA), a encrypted video or television program decoder, a set-top television program receiving device, a video or music program receiving device, or a desktop or portable computer, or a device on board a vehicle (such as an automobile, truck, bus, train, or likewise).

A user of the terminal 3 may, while the terminal 3 is displaying CONTENT received via the network 1, issue a request to search for content complements related to the received content.

To achieve this, the terminal 3 comprises means for selecting the content received. One function of the terminal 3 is then activated to generate identification information for the selected content, using the generating means 7 of the terminal 3. For CONTENT received, the terminal 3 may, for example, save the identifier of the channel and time. For video-on-demand, the terminal 3 may, for example, save the video identifier defined in an electronic guide service (ESG), as well as the time.

The terminal 3 then generates a request to generate a marker whose content will be used for searching for content complements related to the selected content. This request comprises the identification information for the selected content, as well as the user's identification data.

The terminal 3 further comprises transmission means 9 for transmitting the generated request related to the selected content over the network 1 to the server 5.

This request is received by receiving means 11 of the content complement server 5.

These receiving means 11 may be constructed in the form of a gateway.

The receiving means 11 transmit the request to means 13 of the server 5, to process this request.

By processing the request, the server 5 then accesses the identification information of the selected piece of content, as well as the user's identification data.

The means 13 of the server 5 will then generate a marker containing:

the user's identification data, the identification information of the selected content, and search characteristics data enabling an additional search for content related to the selected content.

More precisely, these means 13 comprise description information searching means, said information pertaining to the selected content, such as keywords describing the selected content or the title of the selected scene, in such a way as to determine the theme of the selected content. This information represents the search characteristics data enabling an additional search for content related to the selected content, which are integrated into the marker.

This search for content complements may be performed within a database B1, such as a Content Management System, or CMS.

Once it has been generated, the marker is saved by the server 5 in a dedicated database B2, and advantageously, a confirmation message confirming the generating and saving of the marker in the database B2 is sent to the terminal 3 that issued the request, in order to notify the user that the marker related to the content he/she had selected has been gene rated.

To consult the searched-for content complement(s), the user either can either select the marker contained within the confirmation message, or can check all the markers containing his/her identification data which are saved within the database B2, such as in the form of a list displayed on the display means 6 of the terminal 3, then selecting, using the selection means 17, one of the markers in the list.

Preferably, the terminal 3 comprises means for transmitting a request to the server 5, said request relating to the selected marker and requesting the transmission of content complements searched for based on information contained within the selected marker.

The server 5 then runs the search for content complements related to the content selected by the user of the terminal 3.

In order to run this content complement search, the server 5 comprises content complement searching means 19. These searching means 19 preferentially comprise a search engine.

This search may be run within a database B3 internal to the server 5, i.e. belonging to the content provider, but also within a database external to the server 5, for example in order to include Web page references.

Once the search has completed, the server 5 is capable of sending the terminal 3 a list of the various searched-for content complements related to a marker, and thus to the associated content.

Advantageously, this list further comprises information explaining the relationship between a content complement and the selected content. For example, the user can tell whether a content complement is content directed by the same director as the selected content, or if it is audiovisual content from the same television series as a selected piece of audiovisual content, or if the content complement deals with the same theme as the selected content, the theme having been determined using description information searched for by the searching means of the marker-generating means 13 of the server 5.

Thus, the content complements are transmitted to the user only upon his/her request.

This list may be displayed on the terminal 3 and the user may select, using the selection means 20, at least one content complement from among the various content complements related to a marker on the list.

In this manner, the user has access to these content complements only when he/she wishes.

The server 5 further comprises management means 23 for managing the markers containing all the information related to an associated piece of content, and which are saved within the database B2.

The management means 23 namely make it possible to transmit a list of the markers saved within the database B2, and to remove outdated markers using means 21 of the terminal 3.

In one variant embodiment, the markers are removed automatically by the server 5 if the marker's selection quota compared to the markers availability time within the dedicated database B2 is less than a predetermined threshold.

Consequently, the database B2 does not become clogged with obsolete markers; the user thereby manages the markers related to content that interests him/her.

Figure 2:
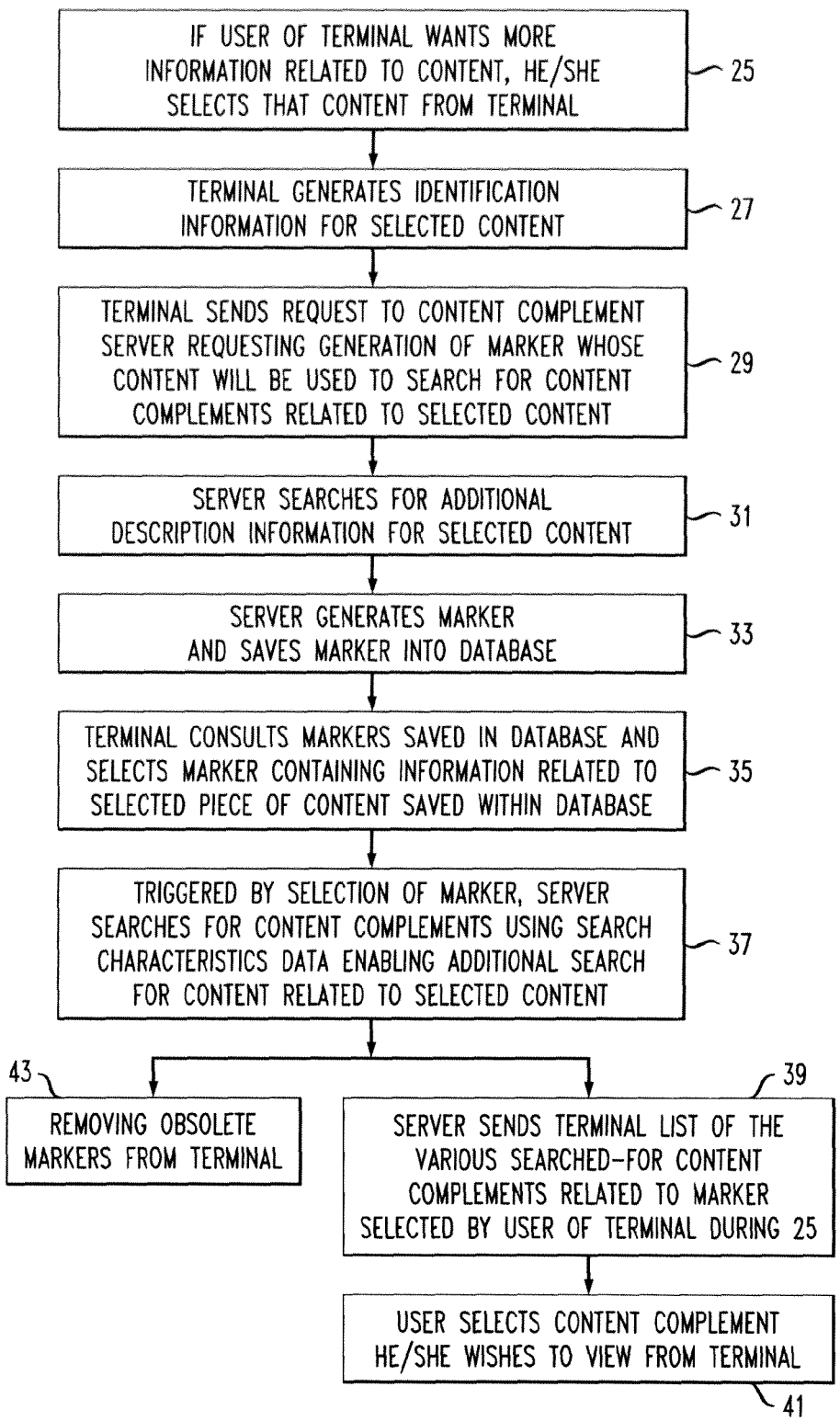
FIG. 2 depicts the successive steps of a method for generating data enabling searching for content complement according to the invention.

As depicted in FIG. 2, the method for generating data enabling searching for content complements intended for terminals of a telecommunication network (1) comprises several steps, detailed below.

If, when the terminal 3 is displaying content, a user of the terminal 3 wants to have more information related to that content, he/she then selects that content from the terminal 3, which is step 25.

Following this step 25, the terminal generates identification information for the selected content, during a step 27.

Next, the terminal 3, during a step 29, sends a request to the content complement server 5, requesting the generation of a marker whose content will be used to search for content complements related to the selected content, the request containing:
the user's identification data, and
the identification information of the selected content.

Upon the receipt of the request, the server 5 searches for additional description information for the selected content, such as keywords describing the selected content. This search is run within a database B1 of a Content Management System, or CMS. This search particularly makes it possible to define the theme of the selected content, which is step 31.

Afterwards, the server 5, during a step 33, generates a marker containing:
the user's identification data,
the identification information of the selected content, and
search characteristics data enabling an additional search for content related to the selected content. This characteristics data particularly comprises the additional description information searched for during step 31.

The server 5 then saves the marker generated in this manner into the database B2, during step 33.

Preferably, once the marker has been saved in the database B2, the server 5 generates and sends to the terminal 3 a confirmation message confirming the generation and saving of the marker in the database B2.

To consult the searched-for content complements, according to one embodiment, the method comprises a step of selecting, from the terminal 3, the marker contained within the confirmation message.

The method continues with a step 35 of consulting all the markers saved in the database B2 in the form of a list, and selecting, from terminal 3, a marker containing all the information related to a selected piece of content saved within the database B2.

To that end, the method may comprise a step wherein the terminal 3 sends the server 5 a request related to the selected marker, requesting the transmission of searched-for content complement.

In one step 37 triggered by the selection of the marker, the server 5 searches for content complements using search characteristics data enabling an additional search for content related to the selected content. This search is run in the database B3 internal or external to the server 5.

Preferentially, the method comprises a step 39 wherein the server 5 sends the terminal 3 a list of the various searched-for content complements related to the marker selected by the user of the terminal 3 during step 25.

Advantageously, this list further comprises information explaining the relationship between the searched-for content complements and the selected content.

Following this step 39, the method comprises a step 41 wherein the user selects the content complement that he/she wishes to view from the terminal 3.

This step 41 is advantageously followed by a step of the terminal 3 reading the selected content complement.

Preferably, the method comprises a step 43 of removing obsolete markers from the terminal 3.

The method is advantageously implemented by a system comprising at least one content complement server 5 and a suitable terminal as described above.

It should therefore be understood that with such a method, the user has personalized access and content complements adapted for him/herself, upon his/her own request.

The invention claimed is:

1. A method for generating data enabling a search for content complements intended for terminals of a telecommunication network, comprising:
selecting content from the telecommunication network at a terminal, the terminal being associated with a user,
generating identification information at the terminal for the selected content, and
sending a marker generation request from the terminal to a content complement server, said request including:
user identification data for the user associated with the terminal, and
the generated identification information for the selected content;
wherein the content complement server is configured to generate and save a marker in a marker database within the content complement server in response to receiving the marker generation request, wherein the saved marker is available for selection by the user to run a search for content complements related to the selected content, the marker including:
the user identification data,
the generated identification information for the selected content, and
search characteristics data for the search for content complements related to the selected content;
the method further comprising:
selecting, from the terminal, the marker saved by the content complement server, wherein selecting said marker triggers a search by said content complement server for content complements based on at least some data included within said selected marker;
wherein the content complement server is configured to send a list of content complements to the terminal, the list of content complements resulting from the search triggered by the selected marker;
wherein the list of content complements further comprises information explaining a relationship between the content complements and the selected content.

2. The method according to claim 1, wherein the content selected from the terminal is audiovisual content.

3. The method according to claim 1, further comprising:
at the terminal, selecting at least one of said content complements from the list of content complements.

4. The method according to claim 3, further comprising:
at the terminal, reading the content complement selected from the list of content complements.

5. The method according to claim 1, further comprising:
receiving a confirmation message at the terminal from the content complement server, the confirmation message including the marker and confirming the marker was generated and saved by the content complement server.

6. The method according to claim 5, further comprising:
selecting the marker included in the confirmation message at the terminal; and
transmitting a request from the terminal to the content complement server to trigger the search for content complements related to the selected content by the content complement server.

7. The method according to claim 6, further comprising:
receiving a list of content complements related to the selected content from the content complement server at the terminal after the content complement server runs the requested search.

8. The method according to claim 1, further comprising:
at the terminal, checking markers saved by the content complement server that include user identification data for the user associated with the terminal;
selecting the marker that includes search characteristics data for the search for content complements related to the selected content from the markers that include user identification data for the user; and
transmitting a request from the terminal to the content complement server to trigger the search for content complements related to the selected content by the content complement server.

9. The method according to claim 8, wherein all markers saved by the content complement server that include user identification data are displayed in a list on the terminal and the marker that includes search characteristics data for the search for content complements related to the selected content is selected from the list.

10. A system for generating data enabling searching for content complements intended for terminals of a telecommunication network, comprising:
a terminal of the telecommunication network, the terminal being associated with a corresponding user and comprising:
a content selection processor configured to select content from the telecommunication network,
a generate processor configured to generate identification information for the selected content, and
a transmitter configured to transmit a request to a content complement server to generate at least one marker enabling searching for content complements related to the selected content, the request including:
user identification data for the corresponding user associated with a corresponding terminal, and
the generated identification information for a corresponding selected content, and
at least one content complement server in operative communication with the terminal, each content complement server comprising:
a receiver configured to receive requests transmitted by the terminal, each request including:
the corresponding user identification data, and
the generated identification information for the corresponding selected content, and
a generate and save processor configured to generate and save, based on each request transmitted by the terminal, a corresponding marker in a marker database within the corresponding content complement server such that the corresponding saved marker is available for selection by the corresponding user to run a search for content complements related to the corresponding selected content, each marker including:
the corresponding user identification data,
the generated identification information for the corresponding selected content, and
search characteristics data for the search for content complements related to the corresponding selected content;
each content complement server further comprising:
a search processor configured to trigger a search for content complements in response to the terminal selecting the saved marker based on at least some data included within the selected marker; and
a transmitter configured to send a list of content complements resulting from the search triggered by said selected marker to said terminal from the content complement server;
wherein the list of content complements further comprises information explaining a relationship between the content complements and the selected content.

11. A terminal of a telecommunication network, the terminal being associated with a user and comprising:
a content selection processor configured to select content from the telecommunication network,
a generate processor configured to generate identification information for the selected content, and
a transmitter configured to transmit a request to a content complement server for generating and saving of a marker in a marker database within the content complement server such that the saved marker is available for selection by the user to run a search for content complements related to the selected content, the request including:

user identification data, and
the generated identification information for the selected content;
wherein the content complement server is configured to generate and save a marker in a marker, database within the content complement server in response to receiving the marker generation request, wherein the saved marker is available for selection by the user to run a search for content complements related to the selected content, the marker including:
the user identification data,
the generated identification information for the selected content, and
search characteristics data for the search for content complements related to the selected content;
the terminal further comprising:
a marker selection processor configured to select the marker saved by the content complement server, wherein selecting said marker triggers a search by said content complement server for content complements based on at least some data included within said selected marker;
wherein the content complement server is configured to send a list of content complements to the terminal, the list of content complements resulting from the search triggered by the selected marker;
wherein the list of content complements further comprises information explaining a relationship between the content complements and the selected content.

12. The terminal according to claim 11, further comprising:
a receiver configured to receive a confirmation message from the content complement server, the confirmation message including the marker and confirming the marker was generated and saved by the content complement server.

13. The terminal according to claim 12 wherein the marker selection processor is also configured to select the marker included in the confirmation message;
wherein the transmitter is also configured to transmit a request to the content complement server to trigger the search for content complements related to the selected content by the content complement server.

14. The terminal according to claim 13, wherein the receiver is also configured to receive a list of content complements related to the selected content from the content complement server after the content complement server runs the requested search.

15. The terminal according to claim 11, further comprising:
a check processor configured to check markers saved by the content complement server that include user identification data for the user associated with the terminal;
wherein the marker selection processor is also configured to select the marker that includes search characteristics data for the search for content complements related to the selected content from the markers that include user identification data for the user;
wherein the transmitter is also configured to transmit a request from the terminal to the content complement server to trigger the search for content complements related to the selected content by the content complement server.

16. The terminal according to claim 15, wherein all markers saved by the content complement server that include user identification data for the user associated with the terminal are displayed in a list and the marker that includes search characteristics data for the search for content complements related to the selected content is selected from the list.

17. The terminal according to claim 11 wherein the content selected from the terminal is audiovisual content.

18. The terminal according to claim 11 wherein the content selection processor is also configured to select at least one of the content complements from the list of content complements.

19. The terminal according to claim 18 wherein the content selection processor is also configured to read the content complement selected from the list of content complements.

20. A content complement server for generating data enabling searching for content complements, said content complements being intended for terminals of a telecommunication network, the content complement server comprising:
a receiver configured to receive a request transmitted by a terminal of the telecommunication network, the terminal being associated with a user, the request including:
user identification data for the user associated with the terminal, and
identification information for content selected from the telecommunication network at the terminal, and
a generate and save processor configured to generate and save, based on said request transmitted by the terminal, a marker in a marker database within the content complement server such that the saved marker is available for selection by the user to run a search for content complements related to a corresponding selected content, the marker including:
the user identification data,
the identification information for the selected content, and
search characteristics data for the search for content complements related to the selected content;
the content complement server further comprising:
a search processor configured to trigger a search for content complements in response to the terminal selecting the saved marker based on at least some data included within the selected marker; and
a transmitter configured to send a list of content complements resulting from the search triggered by said selected marker to said terminal from the content complement server;
wherein the list of content complements further comprises information explaining a relationship between the content complements and the selected content.

21. The content complement server according to claim 20 wherein the search processor is also configured to search for content complements based on at least some data included in the marker in response to selection of the marker from the terminal.

22. The content complement server according to claim 20 wherein the search processor is also configured to search for descriptive information pertaining to the selected content to represent the search characteristics data in conjunction with generating the marker for the search for content complements related to the selected content.

23. The content complement server according to claim 20 wherein the transmitter is also configured to send a confirmation message to the terminal, the confirmation message including the marker and confirming the marker was generated and saved by the content complement server.

24. A method for generating data enabling a search for content complements intended for terminals of a telecommunication network, comprising:
receiving a marker generation request from a terminal at a content complement server, the terminal being associated with a user, wherein the marker generation request was generated by the terminal for content selected from the telecommunication network at the terminal, said request including:
  user identification data for the user associated with the terminal, and
  the generated identification information for the selected content, and
generating and saving a marker in a marker database within the content complement server such that the saved marker is available for selection by the user to run a search for content complements related to the selected content, the marker including:
  the user identification data,
  the generated identification information for the selected content, and
  search characteristics data for the search for content complements related to the selected content;
the method further comprising:
  triggering a search for content complements in response to the terminal selecting the saved marker based on at least some data included within the selected marker; and
  sending a list of content complements resulting from the search triggered by said selected marker to said terminal from the content complement server;
  wherein the list of content complements further comprises information explaining a relationship between the content complements and the selected content.

25. The method according to claim 24, further comprising:
at the content complement server, searching for descriptive information pertaining to the selected content to represent the search characteristics data in conjunction with generating the marker for the search for content complements related to the selected content.

26. The method according to claim 24, further comprising:
sending a confirmation message from the content complement server to the terminal, the confirmation message including the marker and confirming the marker was generated and saved by the content complement server.

27. The method according to claim 24, further comprising:
at the content complement server, searching for content complements based on at least some data included in the marker in response to selection of the marker from the terminal.

* * * * *